United States Patent [19]
Otsuka et al.

[11] Patent Number: 5,856,881
[45] Date of Patent: Jan. 5, 1999

[54] OPTICAL FIBER TRANSMISSION LINE

[75] Inventors: Kazue Otsuka; Hiroshi Onaka, both of Kawasaki, Japan

[73] Assignee: Fujitsu Limited, Kanagawa, Japan

[21] Appl. No.: 903,894

[22] Filed: Jul. 31, 1997

Related U.S. Application Data

[62] Division of Ser. No. 537,449, Oct. 2, 1995.

[30] Foreign Application Priority Data

Jan. 13, 1995 [JP] Japan ...................................... 7-004514

[51] Int. Cl.⁶ .................................................... H04B 10/12
[52] U.S. Cl. ........................... 359/173; 359/161; 385/127
[58] Field of Search ..................... 359/161, 173, 359/179; 385/123, 124, 126, 127

[56] References Cited

U.S. PATENT DOCUMENTS

| | | | |
|---|---|---|---|
| 4,261,639 | 4/1981 | Kogelnik et al. . | |
| 4,372,647 | 2/1983 | Okamoto et al. | 359/126 |
| 4,755,022 | 7/1988 | Ohashi et al. | 359/126 |
| 4,969,710 | 11/1990 | Tick et al. . | |
| 5,224,183 | 6/1993 | Dugan . | |
| 5,278,931 | 1/1994 | Antos et al. | 359/126 |
| 5,361,319 | 11/1994 | Antas et al. . | |
| 5,504,829 | 4/1996 | Evans et al. . | |
| 5,555,340 | 9/1996 | Onishi et al. | 385/127 |
| 5,559,920 | 9/1996 | Chraplyvy et al. . | |
| 5,568,583 | 10/1996 | Akasaka et al. . | |

FOREIGN PATENT DOCUMENTS

| 56-52705 | 5/1981 | Japan . |
|---|---|---|
| 56-52706 | 5/1981 | Japan . |

OTHER PUBLICATIONS

Vengsarkar et al, "Dispersion–compensating single–mode fibers: efficient designs for first–and second–order compensation", Nov. 1992 pp. 924–926.

A Single–Mode Fiber With Chromatic Dispersion Varying Along the Length; Bogatyre et al May 5, 1991 JLT. (Light Wave Technology).

"Compensation of soliton broadening in nonlinear optical fibers with loss", Tajima Oct. 5, 1986 pp. 54–56 Optical Society of America.

*Primary Examiner*—Rafael Bacares
*Attorney, Agent, or Firm*—Helfgott & Karas, P.C.

[57] ABSTRACT

An optical fiber transmission line capable of suppressing the generation efficiency of four wave mixing in transmitting wavelength multiplex signal light. The transmission line employs a single mode optical fiber in which a zero dispersion wavelength is varied in the longitudinal direction of the optical fiber more largely than manufacturing variations in manufacturing conditions of the optical fiber. The use of this optical fiber as the transmission line suppresses the generation efficiency of four wave mixing in transmitting the wavelength multiplex signal light to allow the transmission of the wavelength multiplex signal light with a reduced crosstalk.

2 Claims, 13 Drawing Sheets

OPTICAL FIBER TRANSMISSION LINE

This is a division of application Ser. No. 08/537,449, filed Oct. 2, 1995.

BACKGROUND OF THE INVENTION

1. Field of the Invention

The present invention relates to an optical fiber transmission line and an optical fiber communication system using the optical fiber transmission line.

2. Description of the Related Art

In recent years, a transmission system capable of performing direct amplification of light has been studied owing to the advent of an erbium doped optical fiber amplifier. In particular, the erbium doped optical fiber amplifier has a wide gain wavelength band and therefore allows wavelength division multiplexing (WDM) transmission and collective amplification and relay of each wavelength. However, the entry of a wavelength multiplex signal having a high light power into an optical fiber causes a new problem such that a nonlinear optical effect in the optical fiber becomes remarkable.

An optical fiber now in use is formed of a silica-based material, which is essentially very small in nonlinearity. However, since a light wave is confined in a microscopic region of about 10 $\mu$m in diameter, a power density becomes very high, and various nonlinear interactions may arise remarkably because of a very large length of interaction between the light wave and the material. Accordingly, the nonlinear optical effect causes a deterioration of transmission characteristics in WDM transmission. The nonlinear optical effect of an optical fiber having an adverse effect on WDM includes stimulated Brillouin scattering, mutual phase modulation, Raman scattering, and four wave (photon) mixing.

According to the literature "IEEE J. Lightwave Technol., vol. 6, no. 11, pp. 1750–1769", the four wave mixing (FWM) of the above-mentioned nonlinear optical effect gives the severest conditions to the design of a communication system. That is, light frequency mixing between signal light waves due to FWM causes generation of new FWM waves, which act as a crosstalk with the original signal light waves to deteriorate the transmission characteristics. The generation efficiency of FWM is decided by a quantity $\Delta\beta$ of phase mismatch between light waves, and $\Delta\beta$ is dependent upon the wavelength space between light waves and the dispersion of an optical fiber. Therefore, in the case of using as the transmission line a dispersion shifted fiber such that a zero dispersion region of the fiber is shifted to a 1.5 $\mu$m band where a transmission loss is minimized, the influence of the FWM becomes remarkable.

Figure 10:
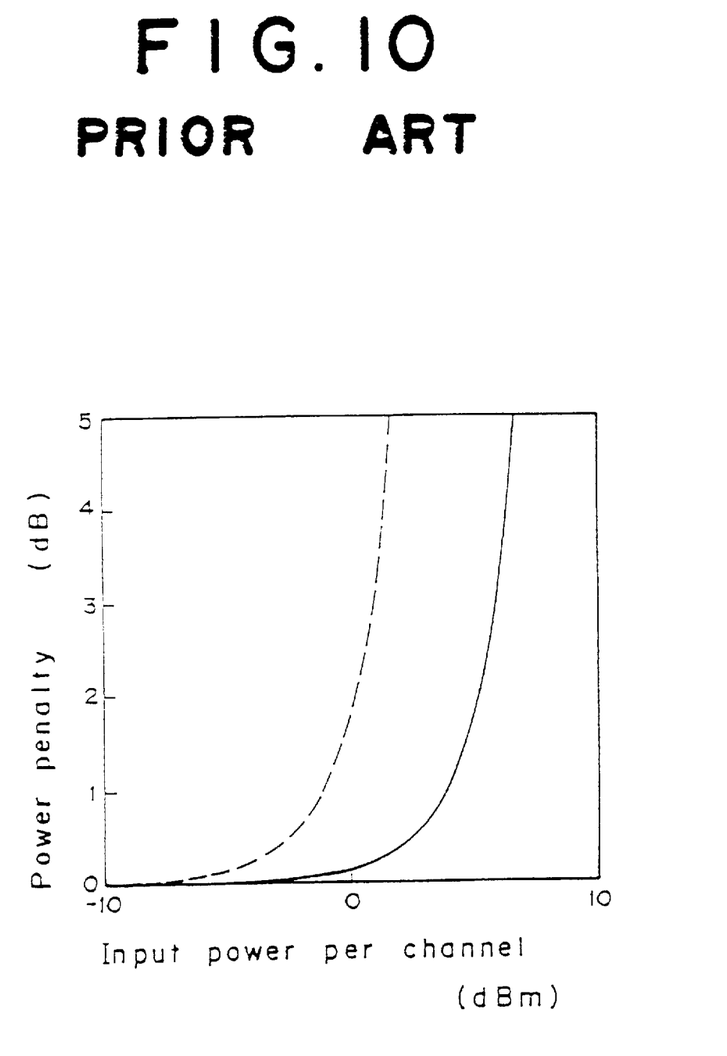
FIG. 10 is a graph showing the relation between an input power per channel and a power penalty.

As an example, FIG. 10 shows a difference in the influence of FWM between two kinds of optical fibers as shown in the literature "IEEE J. Lightwave Technol., vol. 10, no. 3, pp. 361–366". In FIG. 10, the solid line shows a usual fiber, and the broken line shows a dispersion shifted fiber. As the dispersion shifted fiber is largely affected by crosstalk, it is necessary to reduce an input power into the optical fiber, so that the transmission characteristics are largely limited. The results of study mentioned in the above literature are those obtained with the assumption that the characteristics of the optical fiber are ideal, i.e., a zero dispersion wavelength is constant in the longitudinal direction of the fiber. Actually, however, it is considered that there is a change in dispersion value in the longitudinal direction of the optical fiber due to variations in manufacturing conditions of the optical fiber.

Figure 11:
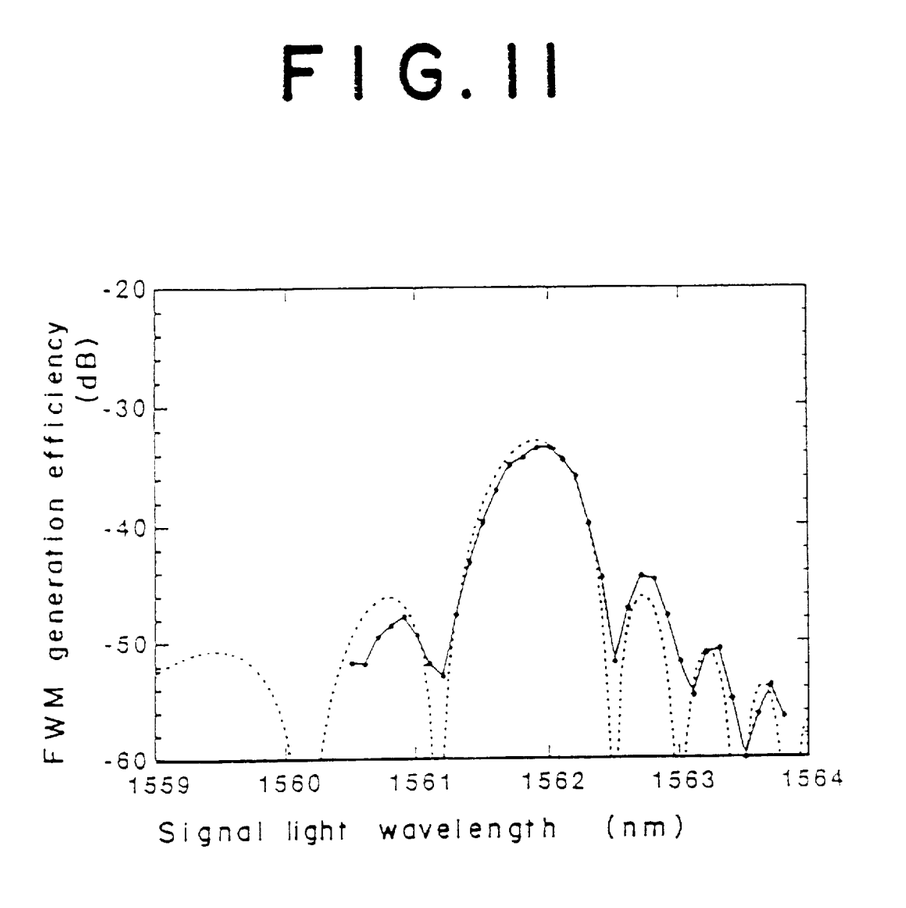
FIG. 11 is a graph showing the relation between a signal light wavelength and the generation efficiency of FWM in the case where the fiber length is 1.1 km.
Figure 12:
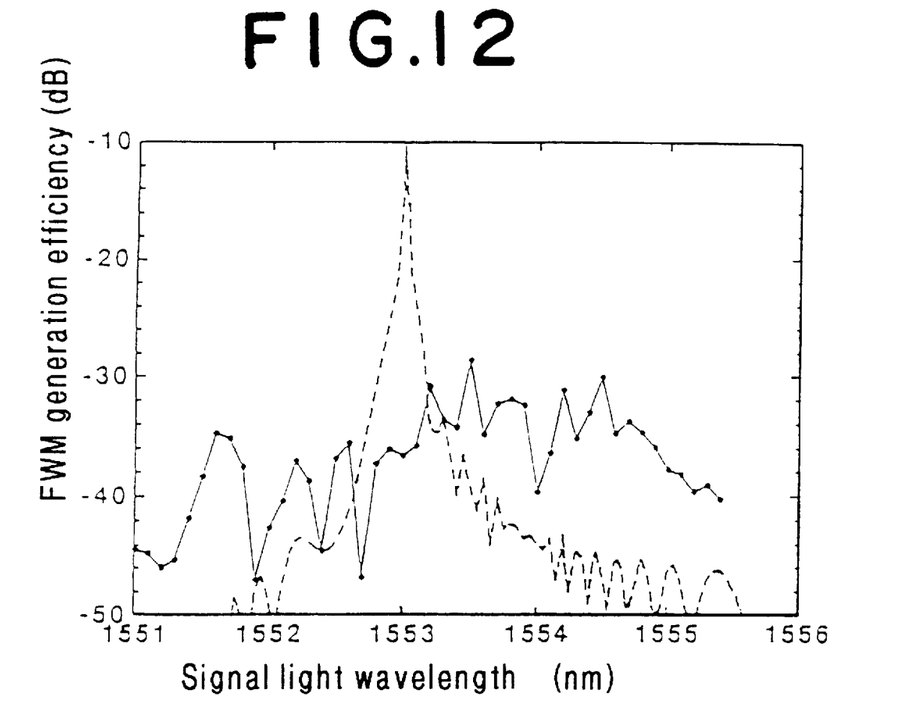
FIG. 12 is a graph showing the relation between a signal light wavelength and the generation efficiency of FWM in the case where the fiber length is 23 km.

Examples of measurement of the distribution of generation efficiency of FWM in an actual dispersion shifted fiber are shown in FIGS. 11 and 12. FIG. 11 shows the relation between a signal light wavelength and an FWM generation efficiency in the case where the fiber length is 1.1 km, and FIG. 12 shows the same relation in the case where the fiber length is 23 km. In each of FIGS. 11 and 12, the broken line shows a calculated value and the solid line shows an experimental value. When the optical fiber is short as shown in FIG. 11, the calculated value and the experimental value are in good agreement with each other, and the generation of FWM is observed at a specific wavelength. To the contrary, when the optical fiber is long as shown in FIG. 12, the steep peak predicted by calculation is not measured in actual, but the FWM wave measured is distributed in a wide range of wavelength. It is understood that this result is due to the variations in dispersion value in the longitudinal direction of the optical fiber.

Figure 13:
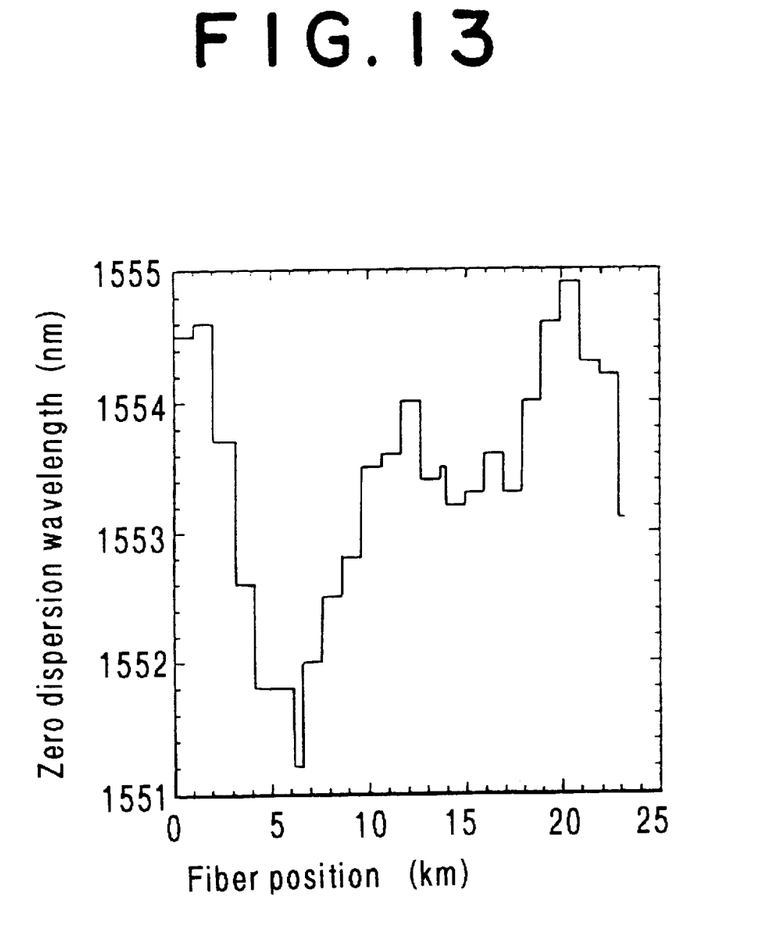
FIG. 13 is a graph showing variations in zero dispersion wavelength.

FIG. 13 shows the result of measurement of variations in zero dispersion wavelength (wavelength where the dispersion value becomes zero) in the longitudinal direction of the optical fiber. This result is one obtained by using the optical fiber corresponding to that shown in FIG. 12, and it is understood that a variation of about 3.5 nm is observed. A maximum inclination is 1.1 nm/km. If the variations in zero dispersion wavelength in the longitudinal direction of the optical fiber are always present, the generation efficiency of FWM is widely distributed, but the generation efficiency of FWM at a specific wavelength is reduces.

Figure 14:
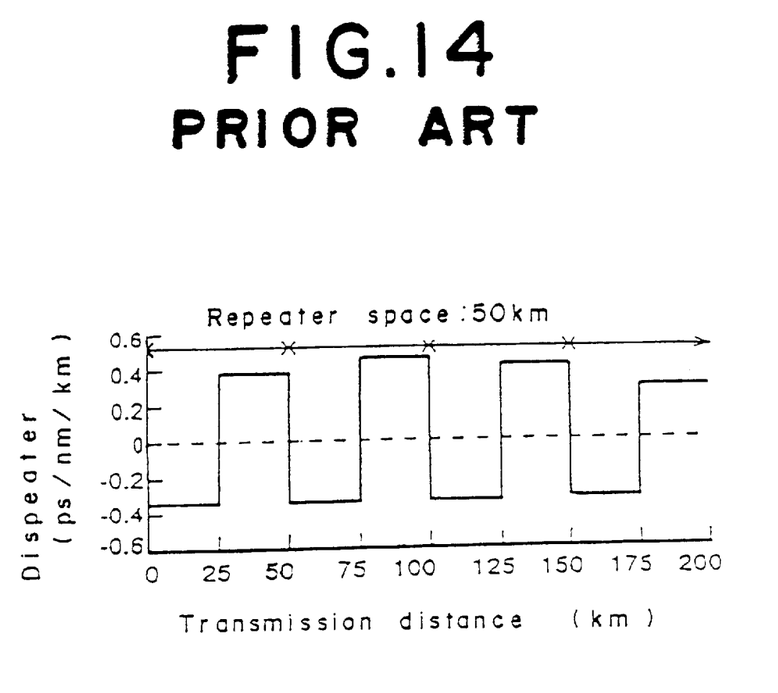
FIG. 14 is a graph showing an example of an optical fiber transmission line in the prior art.

As an example, the literature "Electronic Information and Communication Society, Autumn Great Meeting B-660, 1992" has proposed a method of constructing a transmission line by alternately connecting a fiber having a positive dispersion value and a fiber having a negative dispersion value and making the total quantity of dispersion zero as shown in FIG. 14. This literature has reported that such a construction of the transmission line has improved the transmission characteristics. A primary object of the transmission line shown in this literature is to reduce the crosstalk due to the interaction between noise and signal light from a low-power light amplifier in the case of transmitting a one-wave signal over a long distance.

In general, a noise component is enough smaller than a signal light power, and the generation of FWM between noise and signal light becomes a problem in the transmission over the distances of hundreds of kilometers. Accordingly, it is sufficient to alternate the positive dispersion value and the negative dispersion value at the intervals of tens of kilometers, and it is unnecessary to consider the distribution of the zero dispersion wavelength in each section in the longitudinal direction of the fiber. For example, there is no harm in making completely uniform the zero dispersion wavelength in each section of the fiber.

In contrast, it is considered that a WDM transmission system may generate FWM between high-power signal lights. If a zero dispersion wavelength and a signal light wavelength are very close to each other even over a short distance, the generation efficiency of FWM is rapidly increased. For example, if the zero dispersion wavelength is constant and the signal light wavelength is the same as or close to this even over a short distance of 1 to 2 km, a crosstalk having an influence on the transmission characteristics is generated. Accordingly, the above-mentioned method is not effective in suppressing the crosstalk having an influence on the transmission characteristics.

Further, it is necessary to select a specific fiber having suitable characteristics from many fibers, which causes a problem in practical use. Further, according to the result of measurement on the actual fibers, it cannot be considered that the zero dispersion wavelength in each span is uniform, and it is essentially difficult to construct the transmission line by combining the fibers having positive or negtive dispersion values and making the total dispersion amount zero. The dispersion shifted fiber at present has variations difficult to control due to manufacturing conditions. For example, the literature "IEEE j. Lightwave Technol., vol. 8, no. 10, pp. 1476–1481" has reported 0.03 $\mu$m as a measurement value of variations in core diameter.

Further, it is anticipated that a difference $\Delta n$ in specific refractive index between a core and a clad is also varied according to manufacturing conditions. This difference causes variations in zero dispersion wavelength in the fiber. In the case of WDM transmission by the use of such a wavelength, the amount of crosstalk due to FWM becomes smaller than that in the estimation that the zero dispersion wavelength in the fiber is theoretically uniform in the longitudinal direction of the fiber. However, if the distribution of variations in zero dispersion wavelength follows a normal distribution, there is a possibility of production of fibers excluding the variations in the longitudinal direction with a given probability. In the case where a wavelength multiplex signal is transmitted through a transmission line constructed by randomly selecting these fibers, there is a possibility that FWM may be largely generated.

SUMMARY OF THE INVENTION

It is therefore an object of the present invention to provide an optical fiber transmission line which can suppress the generation efficiency of FWM in transmitting a wavelength multiplex signal.

It is another object of the present invention to provide an optical fiber communication system which can suppress the generation efficiency of FWM to transmit a wavelength multiplex signal with a reduced crosstalk.

In accordance with an aspect of the present invention, there is provided an optical fiber transmission line having a single mode optical fiber in which a zero dispersion wavelength is varied in a longitudinal direction of said optical fiber more largely than manufacturing variations in manufacturing conditions of said optical fiber. Preferably, the variations in the zero dispersion wavelength intentionally given are periodic, and a dispersion value is continuously changed in the longitudinal direction of the fiber. More preferably, the average of the variations in the zero dispersion wavelength intentionally given is made zero.

It is effective that the signal light wavelength and the zero dispersion wavelength are adjusted not to coincide with each other in suppressing FWM. Therefore, it is necessary that the range of variations and the period of variations in the zero dispersion wavelength are made as wide as possible within such a range that a large waveform distortion of the signal light does not occur. It is also necessary that the variations have a suitable inclination in the longitudinal direction so as not to make the zero dispersion wavelength constant.

For example, the lengthwise distribution of the variations in the zero dispersion wavelength intentionally given preferably has a triangular wave shape, a saw-toothed wave shape, a trigonometric function shape, or a random shape. The distribution of the variations having a rectangular wave shape is unsuitable because a dispersion value over a certain distance is constant. Further, in order to obtain variations canceling the influence of the manufacturing variations originally present and becoming greater than the manufacturing variations, the variations in the zero dispersion wavelength must be made greater than those due to the uncontrollable manufacturing variations.

In accordance with another aspect of the present invention, there is provided an optical fiber communication system for transmitting wavelength multiplex signal light through an optical fiber transmission line, comprising a single mode optical fiber in which a zero dispersion wavelength is varied in a longitudinal direction of said optical fiber more largely than manufacturing variations in manufacturing conditions of said optical fiber; an optical transmitter connected to one end of said single mode optical fiber, for transmitting said wavelength multiplex signal light; and an optical receive connected to the other end of said single mode optical fiber.

The use of the optical fiber positively varied in its zero dispersion wavelength as the transmission line allows the zero dispersion wavelength not to coincide with a signal light wavelength, thereby suppressing the generation efficiency of FWM. Accordingly, the crosstalk due to the generation of FWM can be effectively suppressed to allow the transmission of the wavelength multiplex signal with less deterioration in transmission characteristics.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

A preferred embodiment of the present invention will now be described in detail with reference to the drawings.

Figure 1:
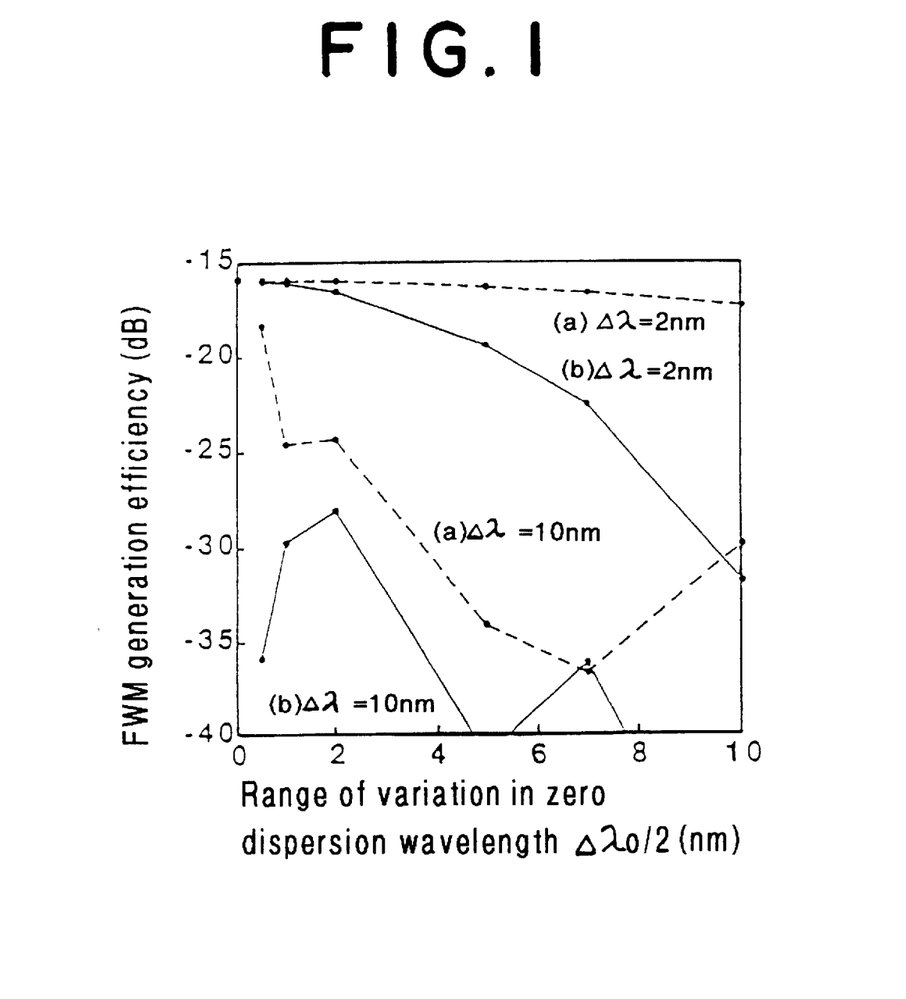
FIG. 1 is a graph showing the relation between the range of variations in zero dispersion wavelength and the generation efficiency of FWM.
Figure 2:
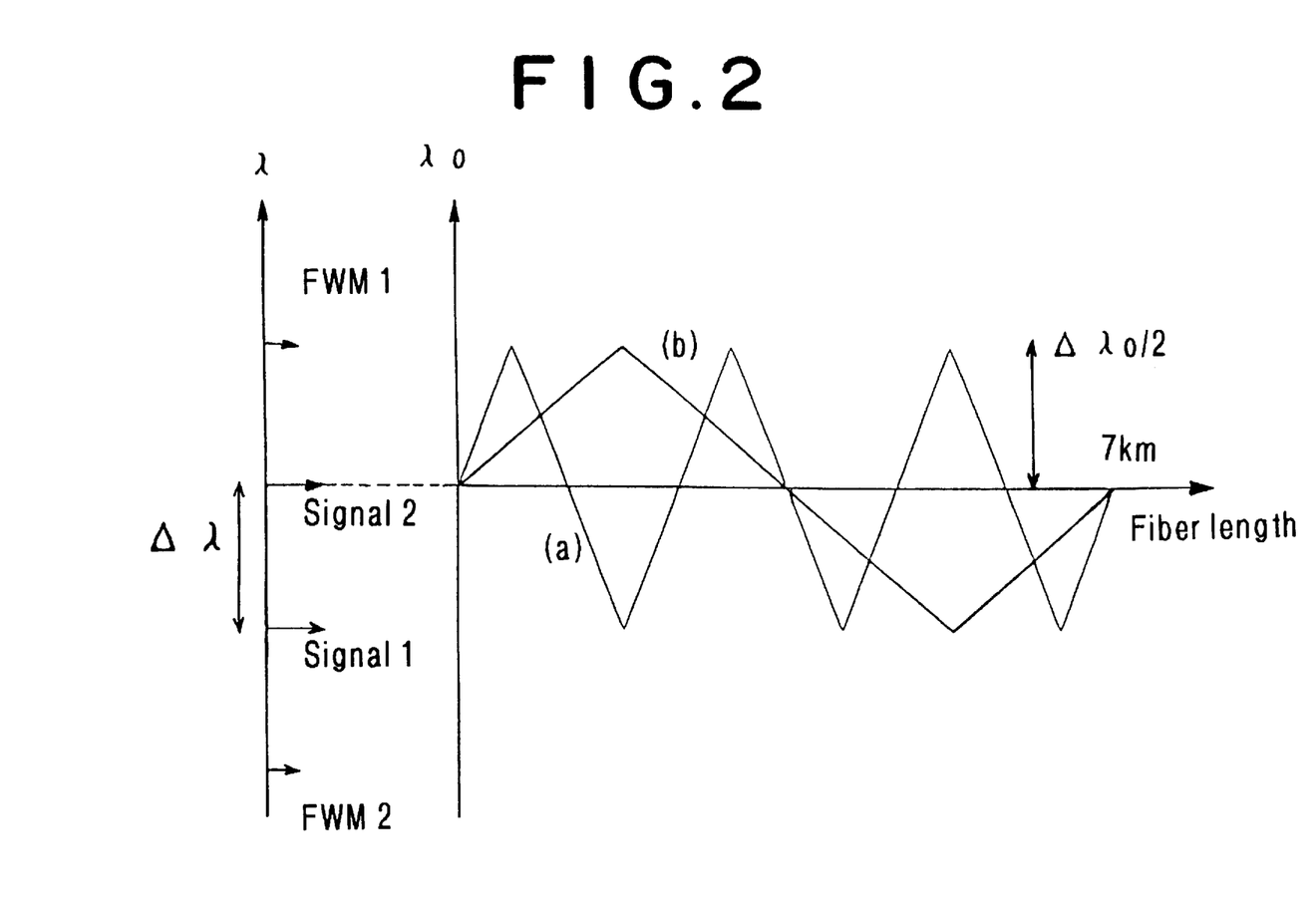
FIG. 2 is a graph showing a distribution model of variations in zero dispersion wavelength.

FIG. 1 shows the result of calculation of the generation efficiency of FWM after transmitting signal light of two waves through a dispersion shifted fiber (DSF) having a length of 7 km. In FIG. 1, the horizontal axis represents a half width of the range of variations in zero dispersion wavelength, and the period of variations and the wavelength space between the signal waves are used as parameters. The broken lines (a) in FIG. 1 correspond to the period of variations in zero dispersion wavelength shown in the graph (a) in FIG. 2, and the solid lines (b) in FIG. 1 correspond to the period of variations in zero dispersion wavelength shown in the graph (b) in FIG. 2. Further, the wavelength space Δλ between the two waves is set to 2 nm and 10 nm.

In FIG. 1, the dots show the generation efficiency of FWM in the case where the zero dispersion wavelength in the fiber is uniform and the signal light wavelength is coincident with the zero dispersion wavelength. As apparent from FIG. 1, the larger the variations in zero dispersion wavelength, the smaller the generation efficiency of FWM. Further, the larger the period of variations, the more effective the decrease in the generation efficiency of FWM.

Figure 3:
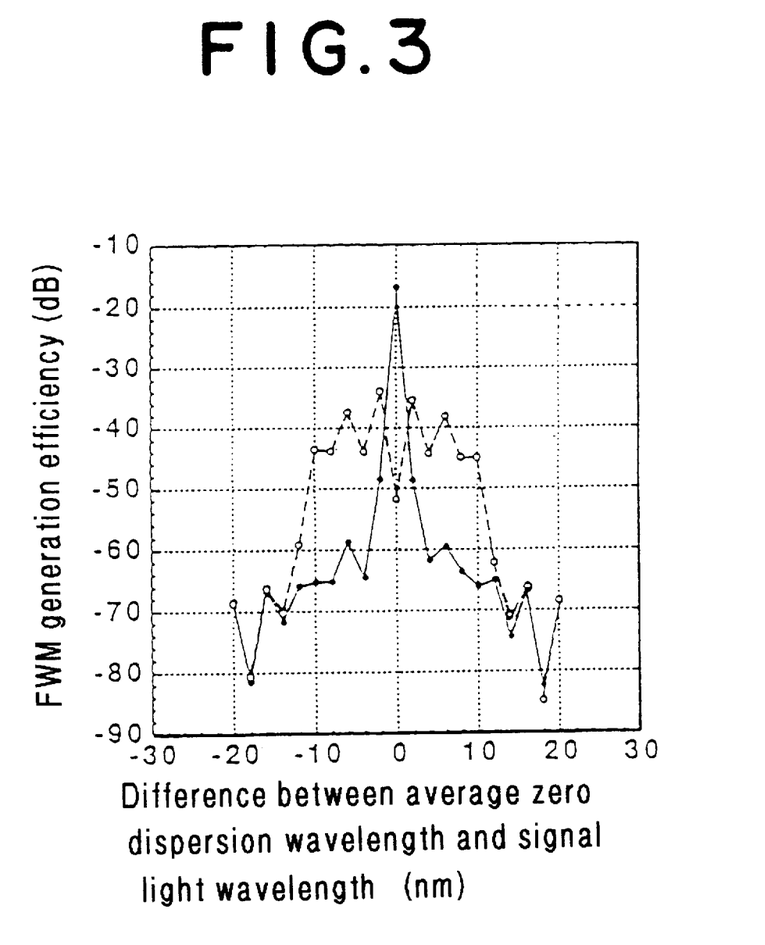
FIG. 3 is a graph showing the generation efficiency of FWM in the case where an average zero dispersion wavelength is shifted from a signal light wavelength.

Referring to FIG. 3, there is shown the result of calculation of the generation efficiency of FWM after transmitting signal light through a dispersion shifted fiber having a length of 7 km in the case where an average zero dispersion wavelength is shifted from a signal light wavelength. In FIG. 3, the solid line corresponds to a conventional fiber in which no variations are given to the zero dispersion wavelength, and the broken line corresponds to the fiber of the present invention in which variations are positively given to the zero dispersion wavelength. An input power of 10 dBm is applied to each fiber.

As apparent from FIG. 3, in the fiber having the variations in zero dispersion wavelength, a wavelength region of generation of FWM is widened, but the absolute value of the generation efficiency is reduced. In the case of designing a crosstalk amount to −30 dB or less, for example, this design value cannot be satisfied in the prior art fiber wherein the zero dispersion wavelength is constant and the signal light wavelength is coincident with the zero dispersion wavelength. However, according to the fiber of the present invention wherein the zero dispersion wavelength is intentionally varied, a desired design value can be satisfied no matter how the average zero dispersion wavelength and the signal light wavelength are related with each other.

As apparent from the above description, it is effective that the signal light wavelength and the zero dispersion wavelength are adjusted so as to differ from each other in suppressing FWM. Therefore, it is necessary that the range of variations and the period of variations in the zero dispersion wavelength are made as wide as possible. It is also necessary that the zero dispersion wavelength is continuously changed in the longitudinal direction of the fiber so as to avoid a constant zero dispersion wavelength. While the range of variations in zero dispersion wavelength is desirably made as wide as possible to suppress the generation efficiency of FWM as mentioned above, it is necessary to suppress the range of variations in zero dispersion wavelength to about 30 nm or less from the viewpoint of suppression of waveform distortion. For example, the fiber lengthwise distribution of variations in zero dispersion wavelength intentionally given preferably has a triangular wave shape, a saw-toothed wave shape, a trigonometric function shape, or a random shape.

For example, a single mode optical fiber continuously changing in positive dispersion value with respect to the signal light to be transmitted and a single mode optical fiber continuously changing in negative dispersion value are connected together so as to nullify the total dispersion, thus constructing an optical fiber transmission line. Accordingly, the waveform distortion due to the dispersion can be canceled to suppress the crosstalk due to the generation of FWM. The variations in zero dispersion wavelength may be realized by changing a difference in specific refractive index between a core and a clad of the optical fiber in the longitudinal direction thereof. Alternatively, the variations in zero dispersion wavelength may be realized by changing a core diameter of the optical fiber in the longitudinal direction thereof.

Figure 4:
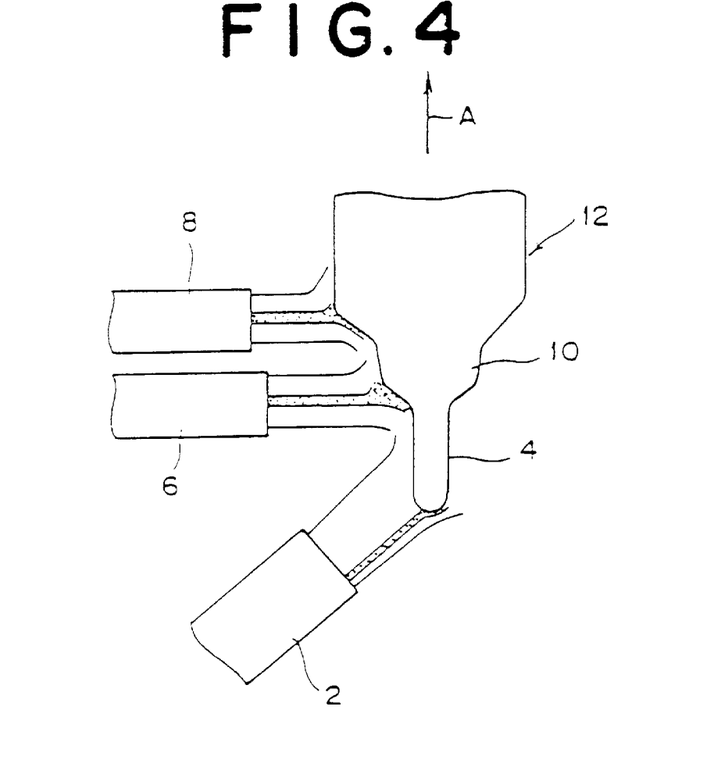
FIG. 4 is a schematic view showing a method of fabricating a preform for a single mode fiber.

Referring to FIG. 4, there is schematically shown a method of manufacturing a preform for a single mode fiber. The method shown is a process of axial vapor deposition, in which a preform 12 formed is raised in the direction of an arrow A. A stock gal is blown from a core burner 2 against the bottom of a rotating rod to form a porous preform 4 as a core portion. The stock gas contains $H_2$, $O_2$, $SiCl_4$, and $GeO_2$, for example. The addition of $GeO_2$ to the stock gas allows an increase in refractive index of the porous preform 4.

A stock gas is next blown from clad burners 6 and 8 against the porous preform 4 to form a porous preform 10 as a clad portion. The stock gas contains $H_2$, $O_2$, and $SiCl_4$, for example. Examples of a dopant to be added to the core portion 4 may include $GeO_2$, $P_2O_5$, and $Al_2O_3$. Further, examples of a dopant to be added to the clad portion 10 may include $B_2O_3$ and F capable of decreasing a refractive index.

Figure 5:
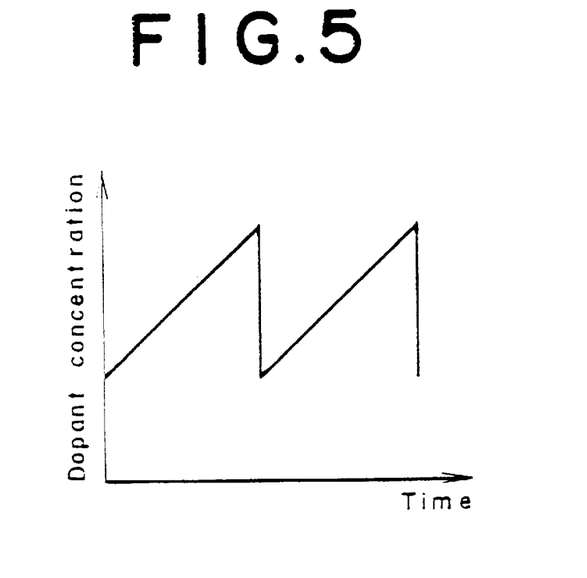
FIG. 5 is a graph showing an example of a perform forming method.

In forming the preform 12 shown in FIG. 4, the concentration of the dopant to be added to the core portion 4 or the clad portion 10 is changed as shown in FIG. 5 to thereby vary a difference in specific refractive index between the core portion 4 and the clad portion 10 of the preform 12 in the longitudinal direction. Then, the preform 12 is drawn to form an optical fiber, thereby lengthwise varying the difference in specific refractive index between a core and a clad of the optical fiber.

Figure 6A:
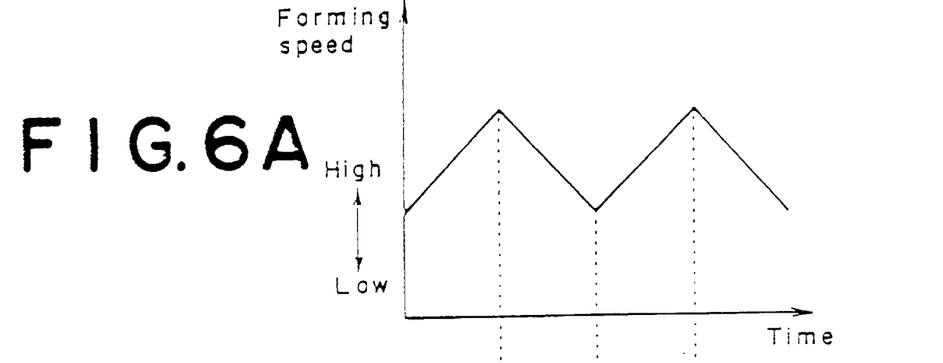
FIGS. 6A and 6B are graphs showing the relation between a preform forming speed and a preform core diameter.
Figure 6B:
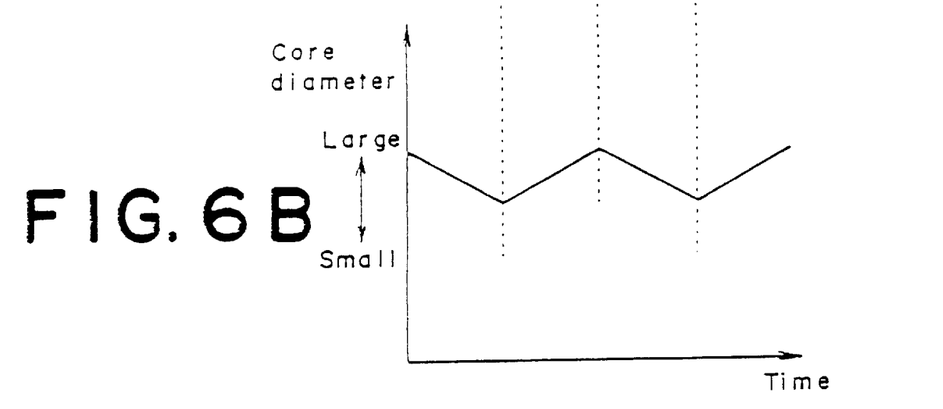

Referring to FIGS. 6A and 6B, there is shown the relation between a preform forming speed and a core diameter in the preform. As apparent from FIGS. 6A and 6B, the core diameter in the preform is changed by changing the preform forming speed with the dopant concentration kept constant. Accordingly, the preform thus formed is drawn to form an optical fiber, thereby changing the core diameter of the optical fiber in the longitudinal direction thereof. As a result, a zero dispersion wavelength can be varied in the longitudinal direction of the optical fiber.

Figure 7:
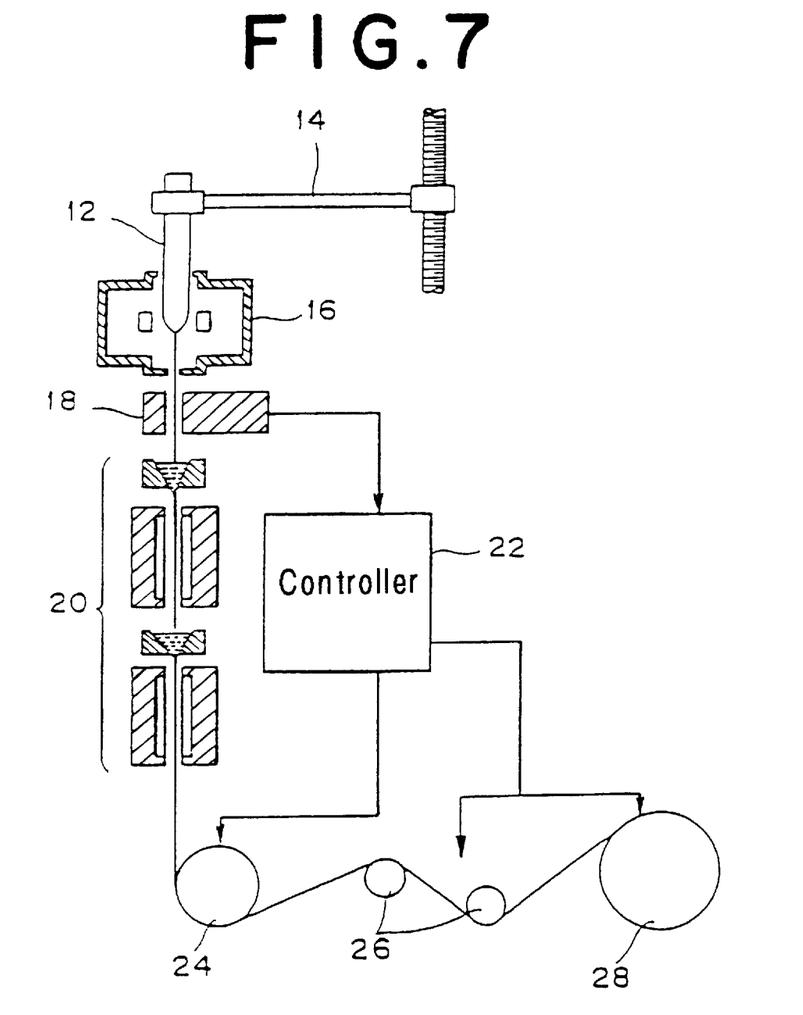
FIG. 7 is a schematic view showing an optical fiber drawing device.

Referring to FIG. 7, there is schematically shown an optical fiber drawing device. The preform 12 is mounted on a precision mount 14, and is gradually fed into a drawing oven 16 at a suitable speed. In the drawing oven 16, the preform 12 is partially heated to 2000° C. or higher. The preform 12 softened by the heat is thinned, and this is continuously drawn to form an optical fiber. During this drawing operation, the diameter of the optical fiber is continuously monitored by a measuring instrument 18 such as a laser micrometer.

The optical fiber drawn from the preform 12 is immediately covered with plastic by a primary covering device 20. The plastic cover serves to protect the fiber from moisture and abrasion. A suitable material for the plastic cover may be a silicone resin, epoxy resin, etc. The optical fiber thus covered with the plastic by the primary covering device 20 is fed through a capstan 24 and a dancer roller 26 to a drum 28, and is wound around the drum 28. A controller 22 is connected to the measuring instrument 18, the capstan 24, the dancer roller 26, and the drum 28 to control these members.

That is, the controller 22 controls these members so as to vary the drawing speed of the optical fiber to be drawn from the preform 12. Accordingly, the core diameter of the optical fiber can be varied in the longitudinal direction of the fiber. Alternatively, the temperature in the drawing oven 16 may be varied with the drawing speed kept constant, thereby varying the core diameter of the optical fiber.

Figure 8:
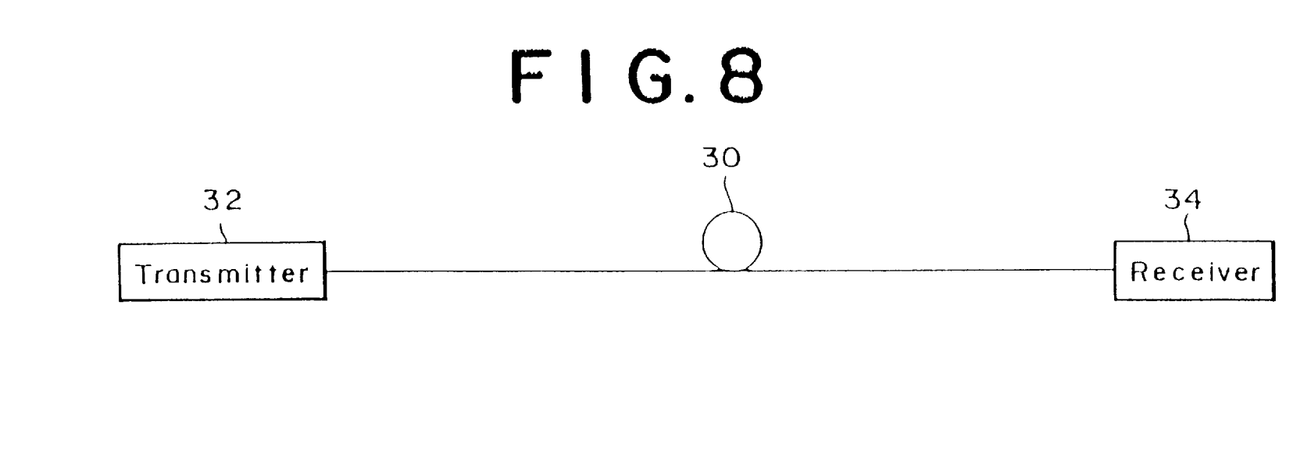
FIG. 8 is a schematic view showing an optical fiber communication system according to a preferred embodiment of the present invention.

An optical fiber communication system employing the optical fiber transmission line of the present invention will now be described with reference to FIG. 8. The transmission line is constructed of a single mode optical fiber 30 in which a zero dispersion wavelength is positively varied in the longitudinal direction. An optical transmitter 32 for transmitting wavelength multiplex signal light is connected to one end of the optical fiber 30, and an optical receiver 34 is connected to the other end of the optical fiber 30. Since the generation efficiency of FWM in the optical fiber 30 is low, the wavelength multiplex signal light transmitted from the optical transmitter 32 is received by the optical receiver 34 without the occurrence of crosstalk.

Figure 9:
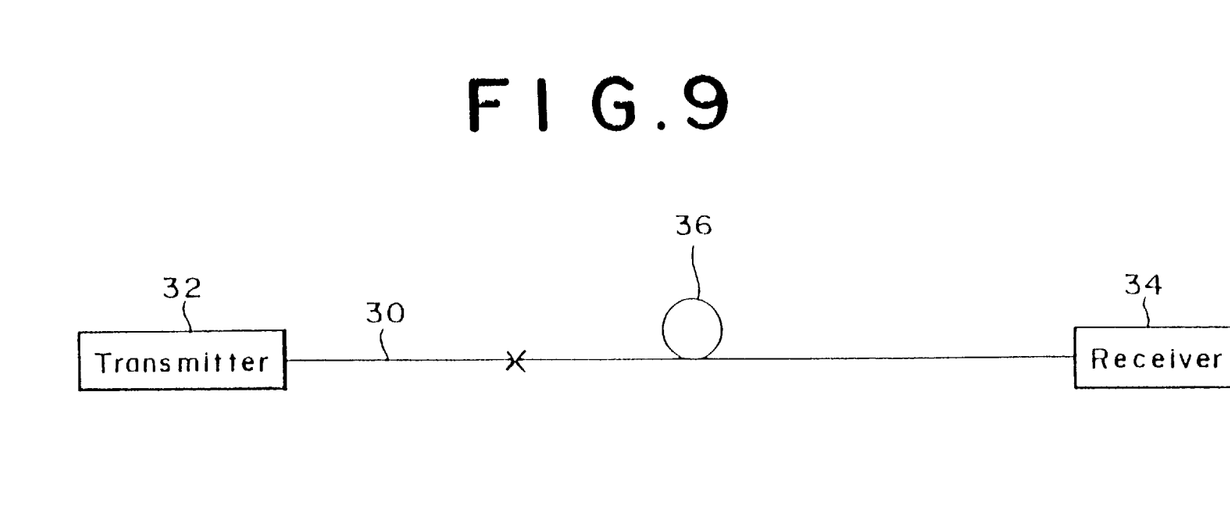
FIG. 9 is a schematic view showing an optical fiber communication system according to another preferred embodiment of the present invention.

Referring to FIG. 9, there is schematically shown another preferred embodiment of the optical fiber communication system. In this preferred embodiment, a single mode optical fiber 30 in which a zero dispersion wavelength is intentionally varied is used as a transmitting side portion of the transmission line where light power is large, and a usual single mode optical fiber 36 in which a zero dispersion wavelength is not varied is used as the other portion of the transmission line, thus performing the transmission of wavelength multiplex signal light.

According to the present invention, the use of an optical fiber in which the factor of generation of FWM in the fiber is controlled in the stage of manufacture of the fiber can eliminate the need for control of a dispersion value in laying the fiber to allow the transmission of wavelength multiplex signal light with a reduced crosstalk.

What is claimed is:

1. An optical fiber transmission line comprising:
   a single mode optical fiber in which a zero dispersion wavelength is varied in a longitudinal direction of said optical fiber in a wider range than dispersion wavelength variations induced by manufacturing conditions;
   wherein a difference in specific refractive index between a core and a clad of said single mode optical fiber is changed in the longitudinal direction of said optical fiber.

2. An optical fiber transmission line comprising:
   a single mode optical fiber in which a zero dispersion wavelength is varied in a longitudinal direction of said optical fiber in a wider range than dispersion wavelength variations induced by manufacturing conditions;
   wherein a diameter of a core of said single mode optical fiber is continuously changed in the longitudinal direction of said optical fiber; and
   wherein said optical fiber is produced by forming a preform with a forming speed thereof being changed while keeping dopant concentration constant, and drawing said preform at a constant speed.

* * * * *